United States Patent
Yamasaki

(10) Patent No.: US 7,353,052 B2
(45) Date of Patent: Apr. 1, 2008

(54) MOBILE TERMINAL APPARATUS

(75) Inventor: Hiroto Yamasaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 435 days.

(21) Appl. No.: 10/960,619

(22) Filed: Oct. 7, 2004

(65) Prior Publication Data
US 2005/0124397 A1 Jun. 9, 2005

(30) Foreign Application Priority Data
Oct. 9, 2003 (JP) .............................. 2003-350412

(51) Int. Cl.
*H04B 1/034* (2006.01)
(52) U.S. Cl. .................. 455/575.4; 361/732; 361/680; 361/681; 455/575.1
(58) Field of Classification Search ............. 455/575.4, 455/575.3, 575.8; 292/87, 103, 147, 204, 292/303; 361/680–681, 732
See application file for complete search history.

(56) References Cited

U.S. PATENT DOCUMENTS

| | | | |
|---|---|---|---|
| 6,788,527 B2* | 9/2004 | Doczy et al. ................ | 361/680 |
| 6,870,740 B2* | 3/2005 | Hsu et al. .................... | 361/732 |
| 6,891,722 B2* | 5/2005 | Chen et al. .................. | 361/685 |
| 6,968,161 B2* | 11/2005 | Inomata et al. ............. | 455/90.3 |
| 7,142,667 B2* | 11/2006 | Harmon et al. ........ | 379/433.13 |
| 2002/0102946 A1 | 8/2002 | SanGiovani | |
| 2002/0132633 A1* | 9/2002 | Johnson et al. ............. | 455/550 |
| 2004/0121825 A1* | 6/2004 | Ma et al. .................. | 455/575.4 |

FOREIGN PATENT DOCUMENTS

| | | |
|---|---|---|
| GB | 2 375 683 | 11/2002 |
| JP | 2002 106544 | 4/2002 |
| WO | WO 03 036921 | 5/2003 |

OTHER PUBLICATIONS

"New mobile product Show Case SO505i (cyber silver) Jun. 4, 2003 release", [online], Jun. 6, 2003, Impress Corporation, [searched on Sep. 25, 2007], Internet,URL:http://k-tai.impress.co.jp/cda/article/showcase_top/14295.html>.
"New mobile product Show Case A530K (formula red) May 16, 2003 release", [online], May 19, 2003, Impress Corporation, [searched on Sep. 25, 2007], Internet<URL:http//k-tai.impress.co.jp/cda/article/showcase_top/14019.html>.

* cited by examiner

*Primary Examiner*—Duc M. Nguyen
*Assistant Examiner*—David Wang
(74) *Attorney, Agent, or Firm*—Frommer Lawrence & Haug LLP; William S. Frommer; Thomas F. Presson

(57) ABSTRACT

An upper housing and a lower housing of a mobile terminal apparatus has a hinge for rotatably and slidably supporting both the upper and lower housings at one end portion of each of the upper housing and the lower housing, and being able to slidably rotate one of the two housings relative to the other to make both the housings to be an opened state or a closed state. Further, positioning means performs a positioning in the closed state by detachably engaging the upper housing with the lower housing on another end portion opposite to the one end portion. As the positioning means is constituted of the projection and recess of the housings, the positioning means can be realized with a relatively simple structure and with a relatively low cost.

6 Claims, 10 Drawing Sheets

F I G. 2
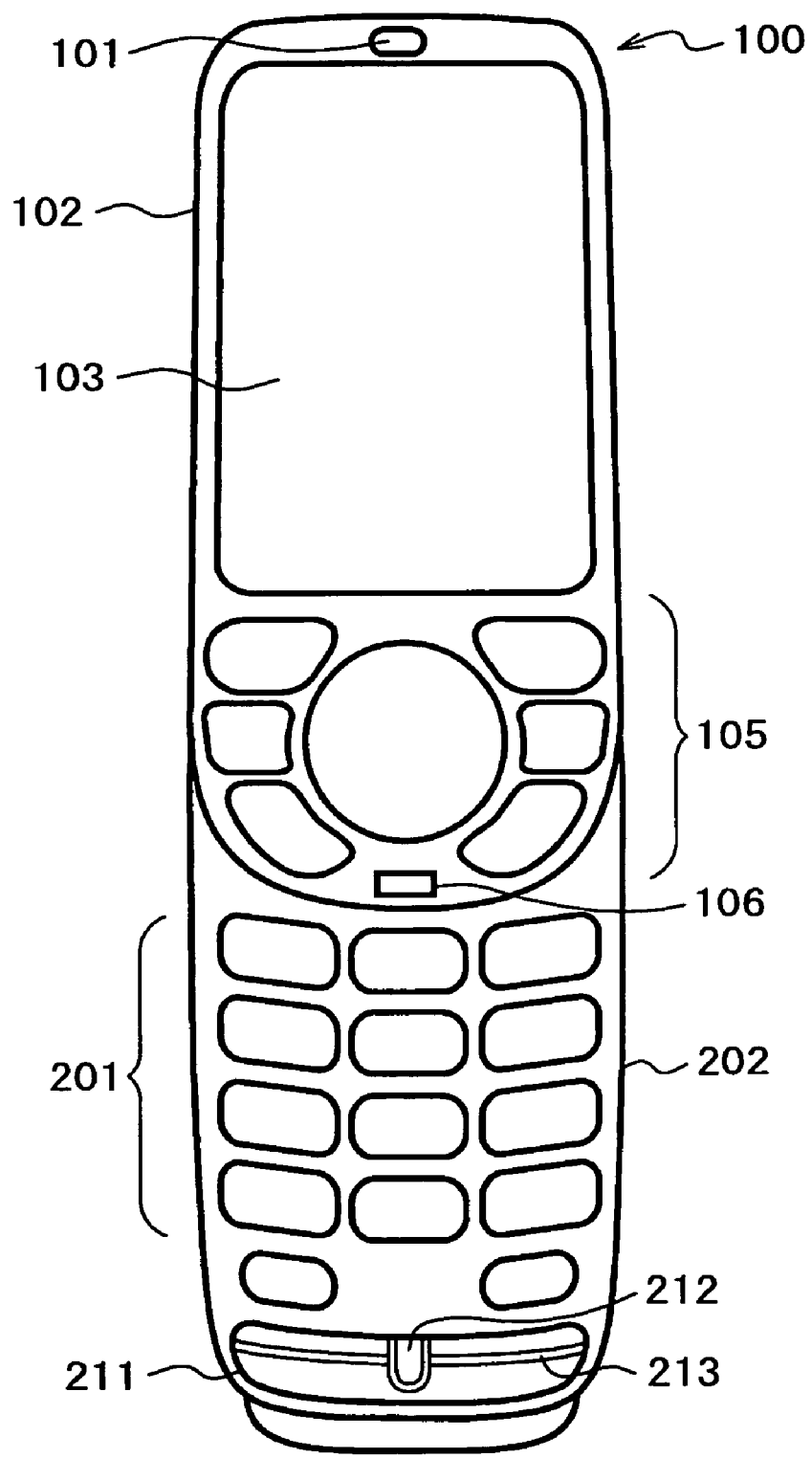

F I G. 4
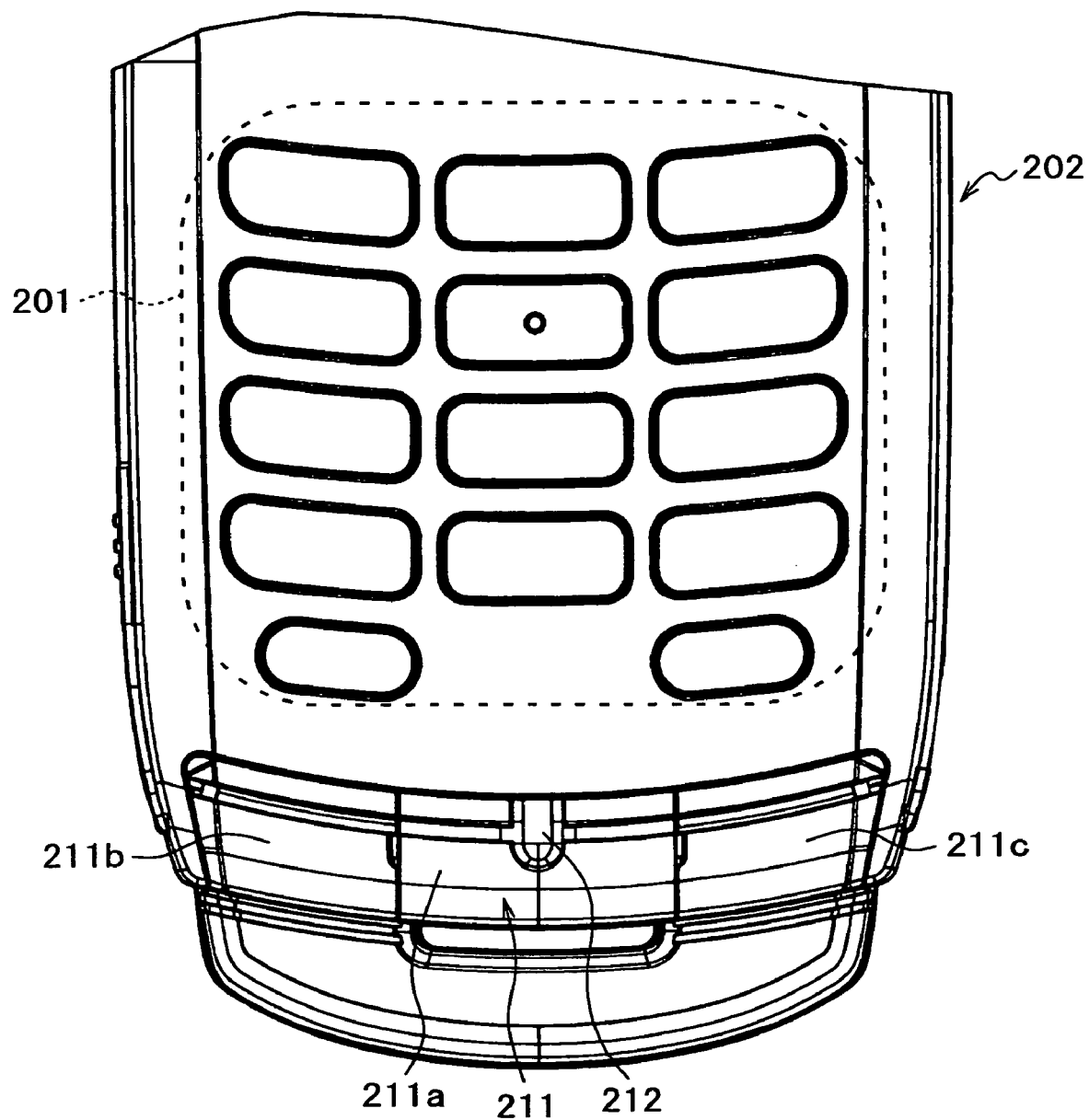

SECTION B-B

SECTION A-A

SECTION C-C

SECTION A-A

MOBILE TERMINAL APPARATUS

BACKGROUND OF THE INVENTION

1. Field of the Invention

The present invention relates to a mobile terminal apparatus, and more particularly to a mobile phone comprising an upper housing and a lower housing in which the upper housing is configured to be slidably and rotatably mounted on the lower housing.

2. Description of the Related Art

Conventionally, a straight type or a flip type is very popular as a shape of a conventional mobile phone. Recently, another type has appeared, wherein an upper housing is placed on a lower housing, a display provided on a main surface of the upper housing is always exposed outside, the upper housing is configured to slidably rotate by 180 degrees via a hinge to expose a key input portion provided on the lower housing (a so-called 180-degree open style) such as disclosed in Japanese Laid-Open Patent No. 2002-135380.

Among slide-rotation type mobile terminal apparatuses (hereinafter simply called a mobile terminal or a terminal), such type that, while holding one of housings with one hand, is able to rotate the other housing both in a clockwise direction and a counterclockwise direction, has advantages in satisfying both right-handed and left-handed users, or user preferences.

However, in a conventional slide-rotation type mobile terminal apparatus, positioning of the lower housing relative to the upper housing when both housings are closed and holding them to the position were relied upon a mechanism and precision of a hinge portion. Therefore, among others, the type in which the upper housing is able to rotate both in a clockwise direction and in a counterclockwise direction, has a low positioning precision because of a piece-to-piece variation of hinges, and the possibility that the position of the upper housing tends to be displaced or tilted relative to the lower housing in the closed state. In order to avoid this inconvenience, if the mechanism of the hinge portion is made complicated, there arises the problem of causing a cost increase.

The present invention has been made in the above-described background and an aspect of the invention is to provide a mobile terminal apparatus of a slide-rotation type having a novel structure capable of realizing a proper positioning and holding of both upper and lower housings with a relatively simple structure.

SUMMARY OF THE INVENTION

A mobile terminal apparatus of the present invention is characterized by comprising: an upper housing and a lower housing; a hinge for rotatably and slidably supporting both the upper and lower housings at one end portion of each of the upper housing and the lower housing, and being able to slidably rotate one of the two housings relative to the other to make both the housings to be an opened state or a closed state; and positioning means for performing positioning in the closed state by detachably engaging the upper housing with the lower housing on another end portion opposite to the one end portion.

With this configuration, the hinge supports both the housings at one end portion of each of the upper housing and the lower housing to allow one of both the housings to slide and rotate relative to the other and make both the housings become the opened state or the closed state. The positioning means performs the positioning in the closed state by detachably engaging the upper housing with the lower housing on the other end portion opposite to the one end portion.

In the closed state, it is preferable that the upper housing is able to rotate in any of a clockwise direction and a counterclockwise direction relative to the lower housing. It is therefore possible to satisfy both right-handed and left-handed users, or user preferences.

In one preferred embodiment, the positioning means is constituted of a projection formed on one of confronting planes of the upper housing and the lower housing and a recess formed in the other and being engaged in by the projection.

The housing having the recess may include a slide contact member formed at least along a rotation locus of the projection, and the recess is formed in the slide contact member at least at one position. The slide contact member constitutes a route along which the projection abuts and slides during slide-rotation of the housing.

The slide contact member may include a projected bar formed at a position corresponding to the rotation locus of the projection. This projected bar functions to increase the height of a front end of the projection disengaged from the recess and contacting the slide contact member, by the height of the projected bar. Therefore, if a key input portion to be depressed and operated is formed on a main front surface of the lower housing, a back surface of the upper housing is spaced apart from the key input portion not only by the height of the projection but also by the height of the projected bar to prevent erroneous depression of any key. It is preferable to structure in a manner that the projection and recess have each a bilaterally symmetric sloped surface at least along the direction of the rotation locus of the projection, and while the projection is engaged in the recess, the projection contacts the surface of the recess on the sloped surfaces on both sides of the projection, and the front end portion of the projection will not contact the surface of the recess. In this manner, it is possible to prevent one housing from being displaced or tilted relative to the other in the closed state of both the housings, without relying upon the mechanism and precision of the hinge.

According to the present invention, in a mobile terminal of a slide-rotation type, since the positioning means is provided on the end portion opposite to the hinge, the positional displacement and tilting of both the housings can be avoided in the closed state, and the positioning precision in the closed state can be improved. Accordingly, a piece-to-piece variation of component precision for hinges can be permitted and the hinge is not required to have the more complicated mechanism and higher precision than necessary, so that the cost of the hinge can be reduced.

As the positioning means is constituted of the projection and recess of the housings, the positioning means can be realized with a relatively simple structure and with a relatively low cost.

BRIEF DESCRIPTION OF THE DRAWINGS

FIG. 2 is a perspective view showing the opened state of the mobile terminal of FIG. 1;

FIG. 4 is a more detailed diagram showing the lower side portion of the mobile terminal of FIG. 1;

DETAILED DESCRIPTION OF THE PREFERRED EMBODIMENTS

In the following, preferred embodiments of the present invention will be described in detail with reference to the accompanying drawings. In the embodiments, although description will be made by using a mobile phone by way of example, the present invention is applicable to an arbitrary mobile terminal apparatus if it has the structure of a slide-rotation type.

Figure 1:
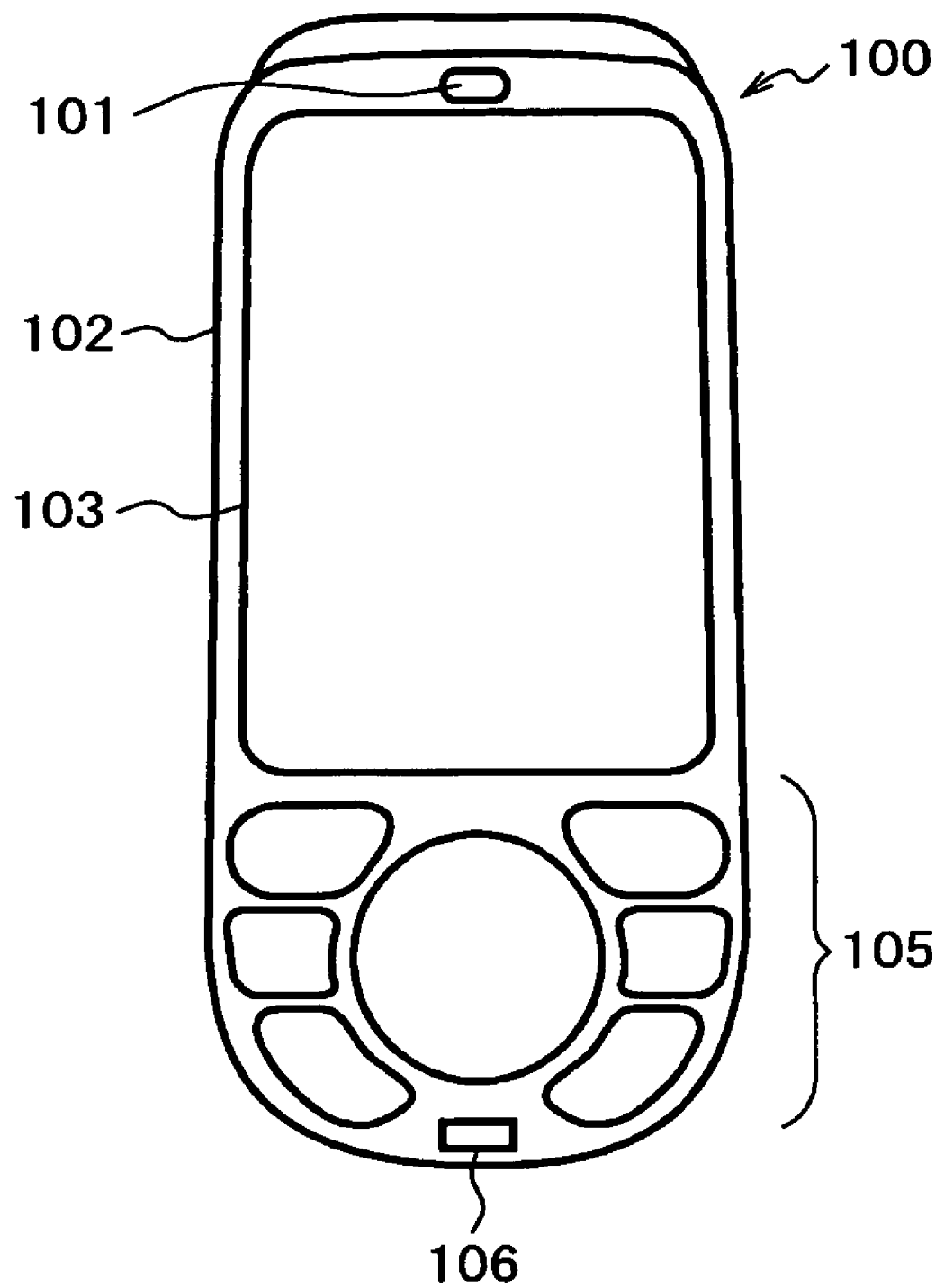
FIG. 1 is a perspective view showing a closed state of a mobile terminal which is a mobile phone of a slide-rotation type according to the embodiment of the present invention.

FIG. 1 is a perspective view of a mobile phone 100 in a closed state which is a slide-rotation type mobile phone according to a preferred embodiment. In this state, a back surface of an upper housing 102 is placed upon a main front surface of a lower housing 202 to lap both the housings. FIG. 2 is a perspective view of the mobile terminal 100 in an opened state (released state).

As clearly shown in FIG. 2, the mobile terminal 100 includes the upper housing 102 and the lower housing 202, a lower end portion of the upper housing 102 is lapped on an upper portion of the lower housing 202, and around a hinge disposed at this lapped position, the upper housing 102 slidably rotates relative to the lower housing in the clockwise direction or counterclockwise direction. This rotation axis is extending in a direction generally vertical to the main front surfaces of both the housings.

In this specification, the description "the upper housing is rotated relative to the lower housing" is described in a relative relation, and a rotational operation of the housing is sufficient if one of the lower housing and upper housing is subjected to a relative rotation relative to the other, and one of the upper housing and lower housing may be used as a reference.

Most of the area of the main front surface of the upper housing 102 is occupied by a display portion 103. The display portion 103 has a display device such as a liquid crystal device and an organic EL device, and its display screen is always exposed to an external. A speaker 101 is disposed in an upper portion of the display portion 103. The speaker 101 is a device for converting electric audio signals into audible sounds. In a lower area of the display portion 103, an operating portion 105 to be used for limited operations is disposed. The operating portion 105 includes various keys such as a call originating key, a power/end key, a clear key, a jog dial capable of being used for a cursor operation and the like, and others. At the lower end of the upper housing 102, a microphone 106 is disposed for converting voices into electric audio signals. The position of the microphone 106 is not limited to the position shown in the drawing. With the structure shown in FIG. 1, it is possible to confirm an incoming call of the phone, mails and the like and to call a partner whose telephone number is registered in a telephone directory, even if the tipper and lower housings are closed (i.e., even if a key input portion 201 including ten-keys of the lower housing 202 is not exposed).

As seen from FIG. 2, the key input portion 201 to be depressed is disposed on the main front surface of the lower housing 202, and hidden at the back of the upper housing 102 in the closed state of FIG. 1. The key input portion 201 includes ten-keys (including numerals 0 to 9, and symbols * and #), a manner key, a memo key, and the like. A slide contact member 211 is fixedly disposed under the key input portion 201 at the lower end of the lower housing 202, i.e., at the end opposite to the hinge. A recess 212 is formed at least at one position (in this case, a central portion) of the slide contact member 201. A projection 112, to be later described, mounted on an upper end portion (refer to FIG. 3) of the upper housing 102 on the back surface side is fitted in the recess 212 when both the housings 102 and 202 are closed. The projection 112 and the recess 212 constitute positioning means of the present invention for detachably engaging the upper housing 102 with the lower housing 202. The slide contact member 211 further includes a plate-like member having a predetermined width and curve along the locus of the projection 112 moving during the slide-rotation of the housing. A projected bar 213 is formed on the surface of the plate-like member along with the moving locus of the projection 112. The projection bar 213 abuts on the projection 112, and in corporation with the height of the projection 112, the projection bar 213 functions to float the upper housing 102 from the lower housing 202 by a predetermined amount in order to guarantee that the upper housing 102 depresses inadvertently the key and the like of the key-input portion 201 on the surface of the lower housing 202. If the height of the projection 112 only is sufficient, the projected bar 213 is not necessarily required to be formed. However, if the projected bar 213 is utilized, it is not necessary to project the projection 112 higher than necessary. Conventionally, the front surface of the lower housing 202 is curved in the concave shape in order to prevent the front surface of the key input portion 201 from contacting the back surface of the upper housing 102. The structure of this embodiment eliminates or reduces the necessity of the curved lower housing 202.

The slide contact member 211 itself is desired to be made of material having a low friction coefficient. The material of this type may be synthetic resin such as polyacetal resin and polyamide (nylon). In this embodiment, a projection support member 111 is made of similar material.

Figure 3:
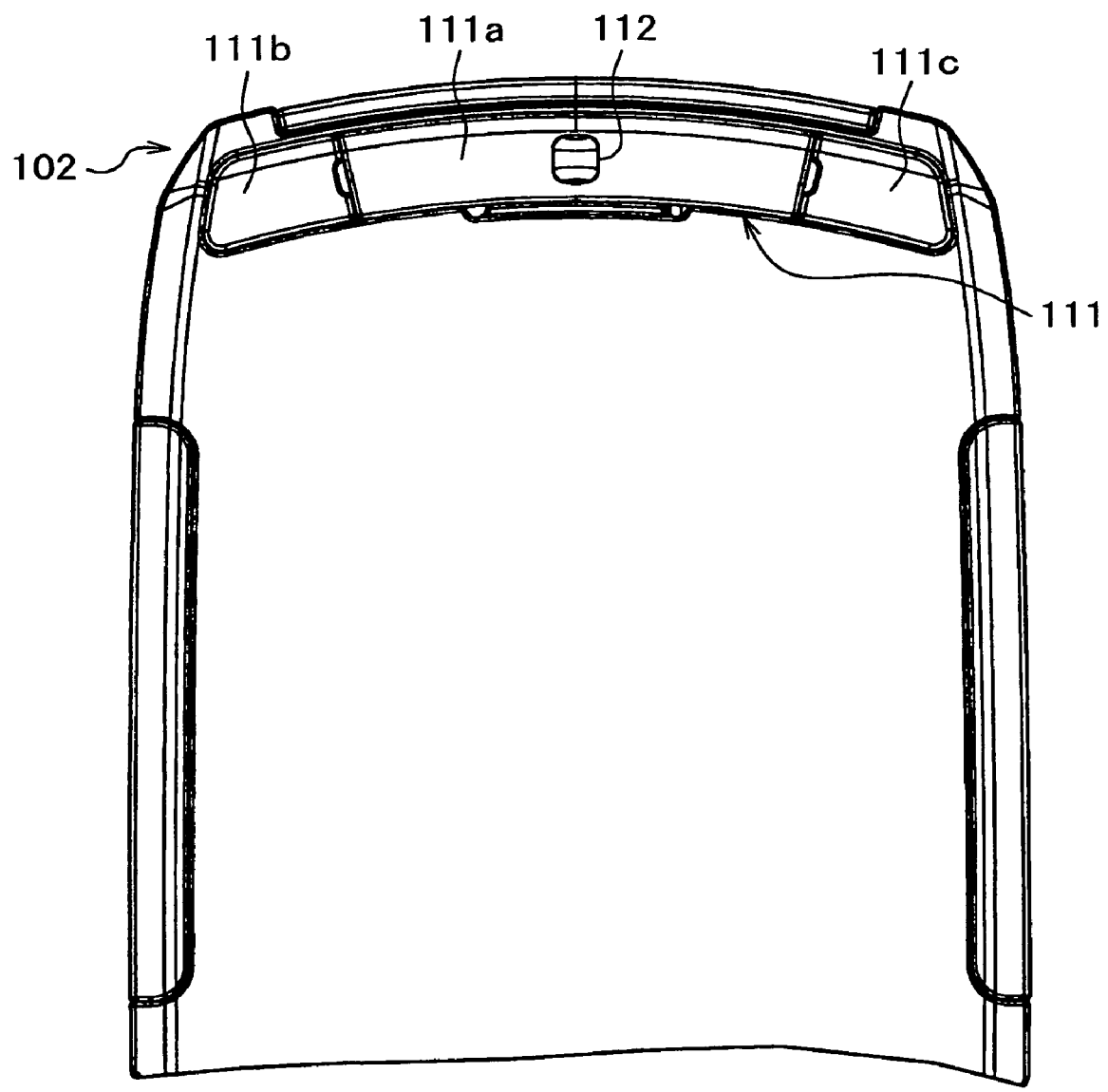
FIG. 3 is a diagram showing the details of the upper end portion of the upper housing of the mobile terminal of FIG. 1.

As shown in FIG. 3, the projection support member 111 is fixedly mounted on the upper end portion of the upper housing 102 on the back surface thereof. The projection 112 projecting along a direction vertical to the main front surface is formed on the projection support member 111 at the position (in this case, a central portion) corresponding to the recess 212 formed in the slide contact member 211 of the lower housing 202. In this example, the projection support member 111 is constituted of three segmented members 111a, 111b and 111c. This is because screw holes (not shown) disposed at the back of the opposite end segmented members 111b and 111c are allowed to be accessed by removing both the segmented members. Therefore, the segmentation of the projection support member 111 is not an essential item of the present invention. Further, although the length of the projection support member 111 extends over the almost whole width of the upper housing 102, the length may be the length of only the central portion having the projection 112.

FIG. 4 is a diagram showing the details of the lower portion of the lower housing 202. As seen from the drawing, similar to the projection support member 111, the slide contact member 211 is also constituted of three segmented members 211a, 211b and 211c. The reason for this is also the existence of screw holes at the back. However, the slide contact member 211 is desired to extend over the whole width of the lower housing 202 in order to allow the projection 112 to abut on the whole width of the lower housing 202.

Figure 5:
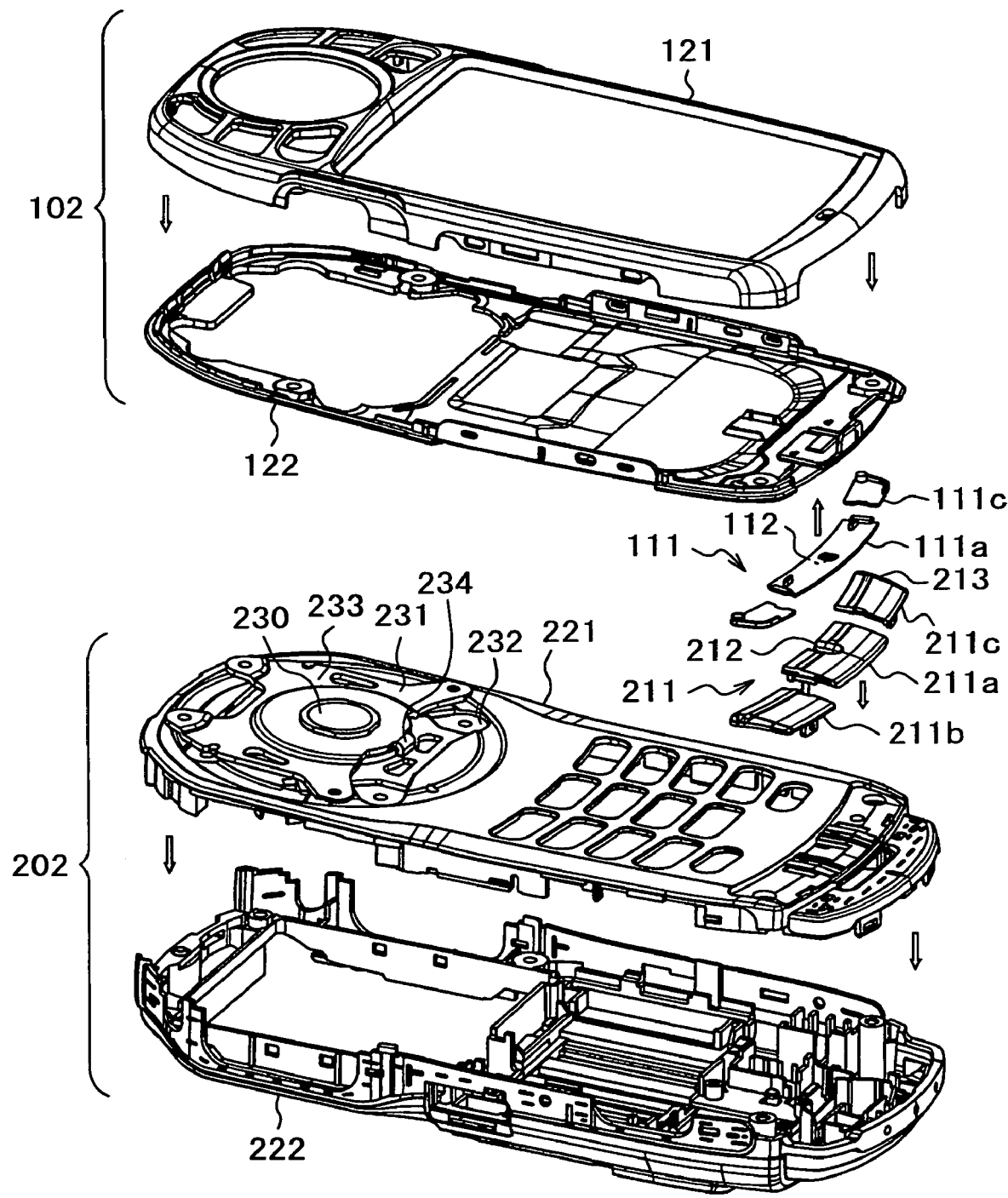
FIG. 5 is a broken perspective view showing the more specific structure of the upper housing and lower housing of FIG. 1.

FIG. 5 is a broken perspective view showing the more specific structure of the upper housing 102 and the lower housing 202. As seen from this drawing, the upper housing 102 is constituted of an upper member 121 and a low member 122, and the projection support member 111 is detachably fixed to the lower end front surface (an end front surface opposite to the hinge 230) of the lower member 122. The lower housing 202 is constituted of an upper member 221 and a lower member 222, and the slide contact member 211 is detachably fixed to the lower end front surface (an end front surface opposite to the hinge 230) of the upper member 221.

The hinge 230 is mounted on the upper end surface of the upper member 221 of the lower housing 202. The hinge 230 is constituted of a base portion 232 and a rotary portion 231 both rotatable about a rotary shaft 233. The rotary portion 231 has an engaging portion 234 for limiting the rotation of the rotary portion 231 relative to the base portion 232 to ±180 degrees. The engaging portion 234 abuts on an engaging portion (not shown) mounted on the base portion 232 or lower housing 202 at ±180 degree positions during the rotation of the rotary portion 231, to thereby function as a stopper.

Figure 6:
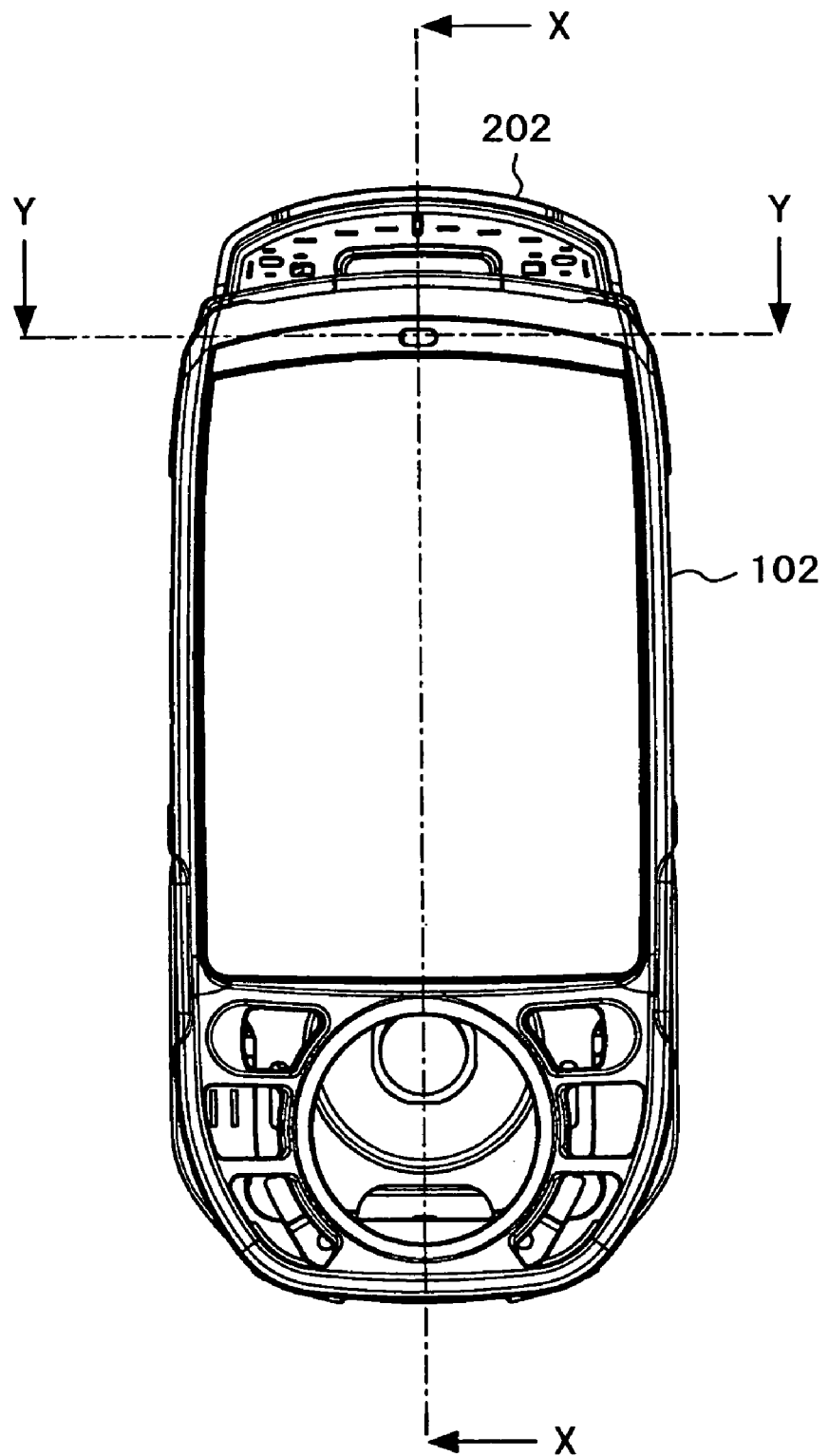
FIG. 6 is a plan view showing the closed (lapped) state of the upper housing and lower housing assembled together and having the specific structure of FIG. 5.

FIG. 6 is a plan view showing the closed (lapped) state of the assembled upper housing 102 and lower housing 202 having the specific structure of FIG. 5. This drawing shows the state that each part of the display portion and operating portion is not mounted.

Figure 7:
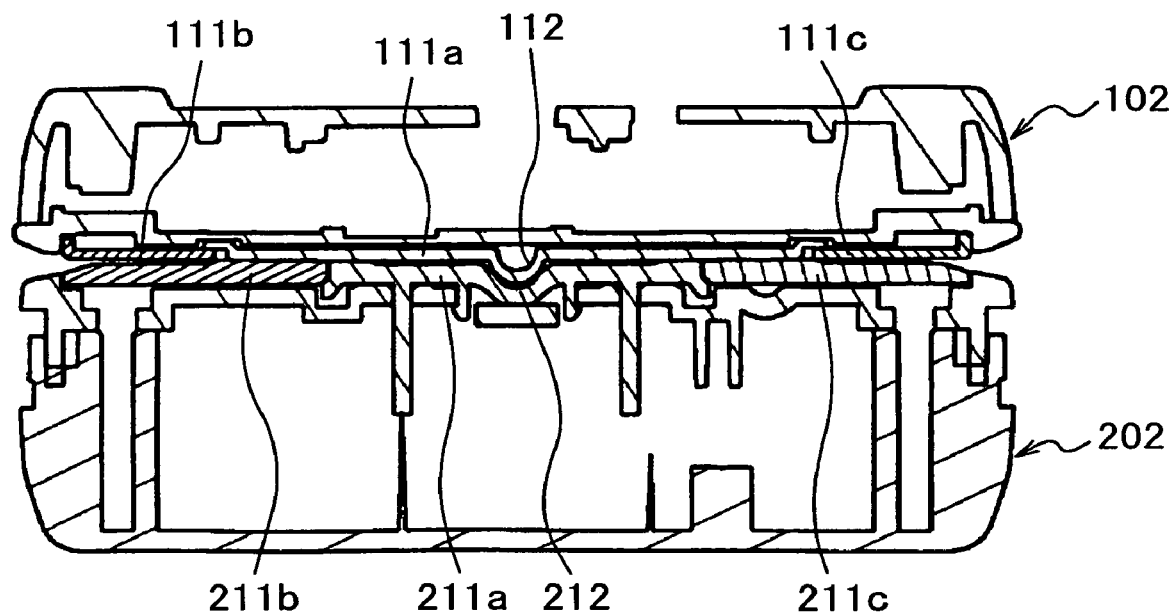
FIG. 7 is a cross sectional view of the mobile terminal of FIG. 6 as viewed along arrow line Y-Y.
Figure 8:
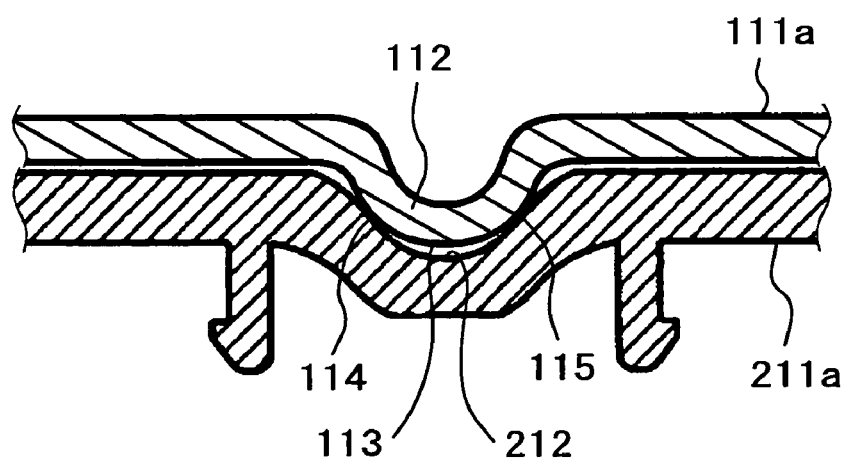
FIG. 8 is an enlarged view of the fitting portion of FIG. 7.

FIG. 7 is a cross sectional view of the mobile terminal of FIG. 6 as viewed along arrow line Y-Y. It can be seen from this drawing, the state that the projection 112 is engaged in the recess 212 when both the housings 102 and 202 are closed. This engaging portion is shown enlarged in FIG. 8. The projection 112 and recess 212 have each a bilaterally symmetric sloped surface (non-upright surface) along the direction of the rotation locus of the projection. While the projection 112 is engaged in the recess 212, although the projection 112 contacts the front surface of the recess 212 on sloped surfaces 114 and 115 on both sides of the projection 112, a front end portion 113 of the projection 112 will not contact the front surface of the recess 212. To this end, a curvature R1 of radius of the bottom of the recess 212 and a curvature R2 of radius of the front end curved portion of the projection 112 are set to be R2>R1. Both the housings 102 and 202 can be positioned and held correctly at the position where the sides of both the housings are aligned together if the widths of both the housings are equal, without a lateral dislocation of the upper housing relative to the lower housing.

The hinge 230 operates to exert a force on the upper housing 102 and lower housing 202 to maintain the state that both the housings become near each other along the axis direction of the hinge 230 (in other words, a force resisting a force which seperates both the housings away from each other along the axis direction). Therefore, the state that the projection 112 is engaged in the recess 212 is maintained unless an external force is exerted. As a user applies a force to one housing to rotate the other housing, the projection 112 is removed from the recess 212 and rides upon the projected bar 213 of the other housing. In this case, an abutting point (or surface) of the projection 112 slides on the sloped surface of the recess 212. At this time, a force component along a direction seperating the lower housing 202 from the upper housing 102 is generated in accordance with the force of rotating the housing(s). Therefore, in order to retract the projection 112 from the recess 212, the user is not required to hold the upper housing 102 above the lower housing 202, and it is sufficient for the user to merely rotate the housing (s).

Figure 9:
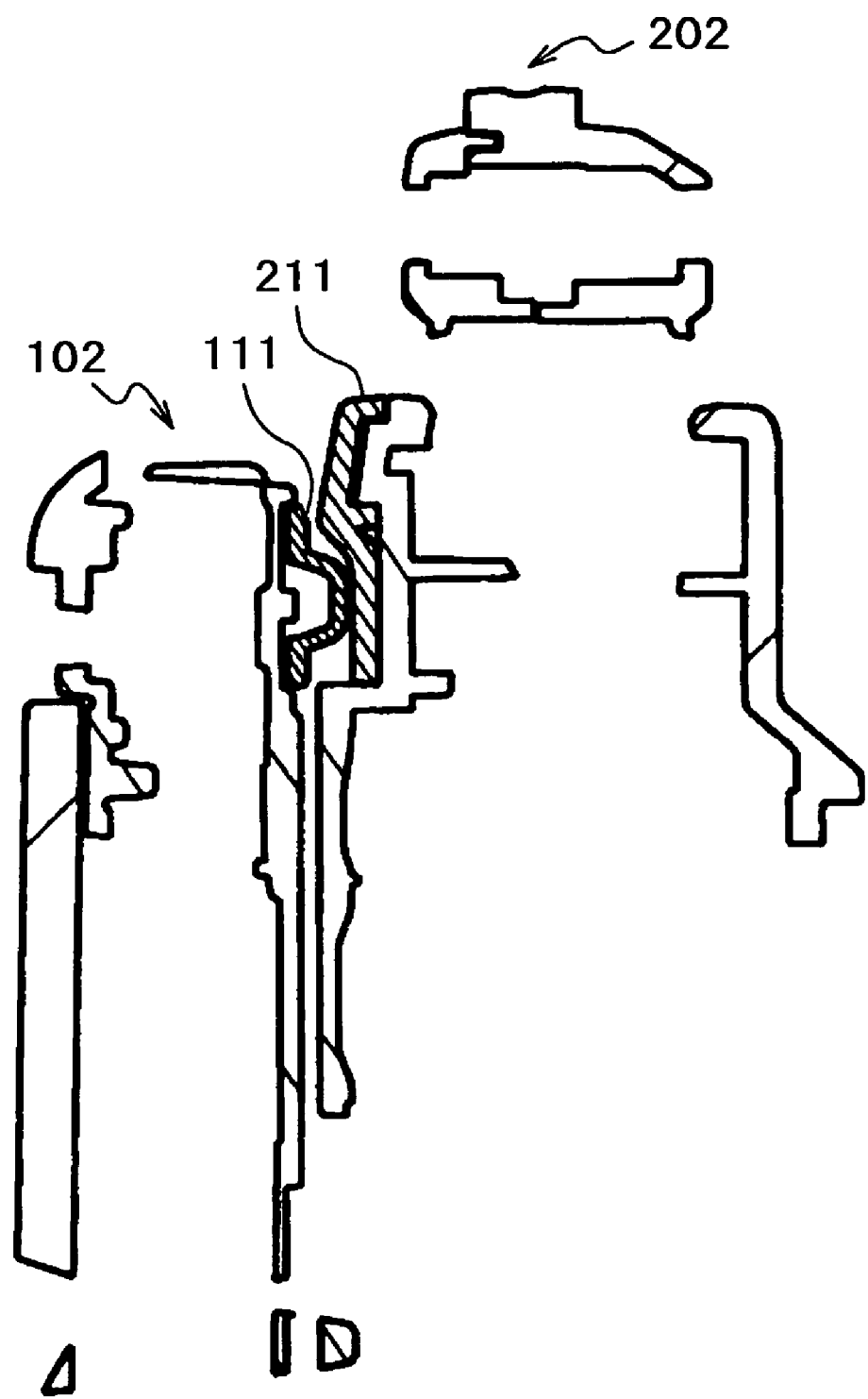
FIG. 9 is a cross sectional view showing the main portion of the mobile terminal of FIG. 6 as viewed along arrow line X-X.

FIG. 9 shows the main parts in the cross sectional view of the mobile terminal of FIG. 6 as viewed along arrow line X-X. As understood from the comparison with FIG. 7, the cross sectional shape of the projection 112 is not required to be the same in both the X-X cross section and the Y-Y cross section perpendicular to each other.

Figure 10A:
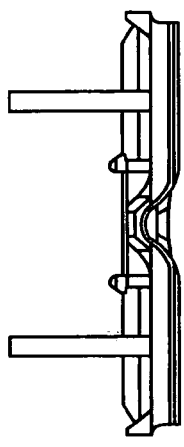
FIGS. 10A to 10G are diagrams showing the specific structure of the central segmented member of the slide contact member according to the embodiment of the present invention.
Figure 10B:
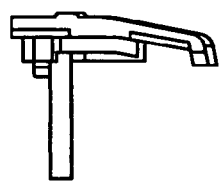
Figure 10C:
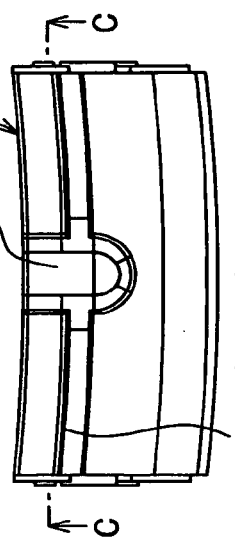
Figure 10D:
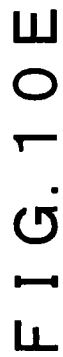
Figure 10E:
Figure 10F:
Figure 10G:
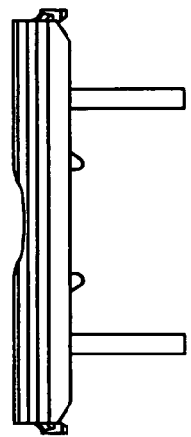

FIGS. 10A to 10G show examples of specific structures of the central segmented member 211a of the slide contact member 211. FIG. 10A is a back view thereof, FIG. 10B is a left side view, FIG. 10C is a plan view, FIG. 10D is a cross sectional view as viewed along arrow line B-B of FIG. 10C, FIG. 10E is a cross sectional view as viewed along arrow line A-A of FIG. 10C, FIG. 10F is a cross sectional view as viewed along arrow line C-C of FIG. 10C, and FIG. 10G is a front view. This segmented member 211a is detachably fixed to the upper member 221 of the lower housing 202, by engaging portions 214 projecting toward the back side.

Figure 11A:
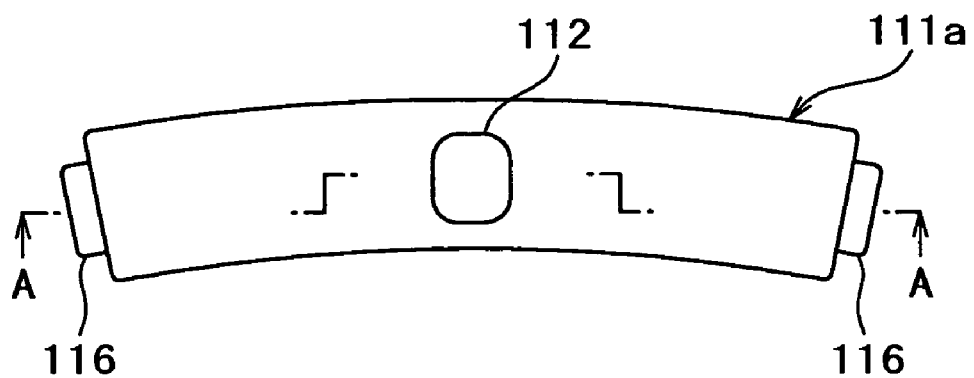
FIGS. 11A to 11C are diagrams showing the specific structure of the central segmented member of the projection support member according to the embodiment of the present invention.
Figure 11B:
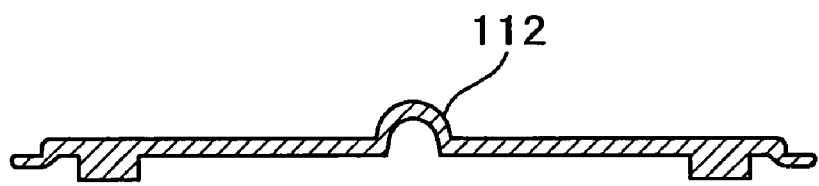
Figure 11C:
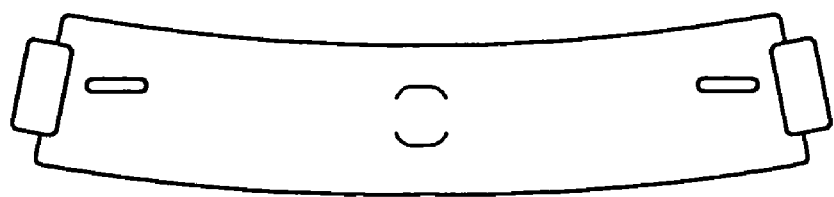

FIGS. 11A to 11C show examples of specific structures of the central segmented member 111a of the projection support member 111. FIG. 11A is a plan view of the segmented member 111a, FIG. 1B is a cross sectional view as viewed along arrow line A-A of FIG. 11A, and FIG. 11C is a back view. This segmented member 111a is detachably fixed to the lower member 122 of the upper housing 102, by engaging portions 116 projecting at both ends.

The preferred embodiments of the present invention have been described above. It is possible to make various modifications and changes in addition to those described above.

For example, although the projection is disposed on the upper housing side and the recess is disposed on the lower housing side, this relation may be reversed. However, since the key input portion is disposed on the front surface of the lower housing, it can be considered that the first-mentioned structure is advantageous from the viewpoint of the operation of the key input portion and the outer appearance. Further, as described earlier, although the present invention is suitable for the application to the type that the housing can be rotated in both the clockwise direction and counterclockwise direction, it is not intended to exclude the application to the type that the housing can be rotated only in one direction.

What is claimed is:

1. A mobile terminal apparatus comprising:
an upper housing and a lower housing, each having a first end portion oppositely disposed from a second end portion;

a hinge for rotatably and slidably supporting both the upper and lower housings disposed at said first end portion of each of the upper housing and the lower housing, such that said housings slidably rotate at said hinge relative to each other between an opened state and a closed state;

positioning means for positioning the housings in said closed state, said positioning means including a projection disposed at the second end portion of one of said housings and a recess disposed at the second end portion of the other housing facing said projection, said projection and recess releasably engaging each other to maintain the housings in a closed state;

wherein each of said projection and recess includes a bilaterally symmetric sloped surface at least along the direction of a rotation locus of the projection; and while said projection is engaged in said recess, said projection contacts the surface of said recess on the sloped surfaces on both sides of said projection, and the front end portion of said projection does not contact the surface of said recess.

2. The mobile terminal apparatus as cited in claim 1, wherein;

said upper housing is able to be rotated in any of a clockwise direction and a counterclockwise direction relative to said lower housing in the closed state.

3. The mobile terminal apparatus as cited in claim 1, wherein;

one of said lower and upper housings having said recess includes a slide contact member formed at least along a rotation locus of said projection; and said recess is formed in the slide contact member at least at one position.

4. The mobile terminal apparatus as cited in claim 3, wherein;

said slide contact member includes a projected bar formed at a position corresponding to the rotation locus of said projection.

5. The mobile terminal apparatus as cited in claim 3, wherein;

said slide contact member is formed with material having a lower friction coefficient than that of material used in said upper and lower housings.

6. The mobile terminal apparatus as cited in claim 1, wherein;

a display unit and an operating portion for limited operation are provided on a main surface of said upper housing, where the main surface thereof being always exposed; and a key input unit for operating by depression is provided on a main surface of said lower housing, where the main surface thereof being exposed when in the opened state.

* * * * *